United States Patent [19]
Murayama et al.

[11] Patent Number: 5,299,209
[45] Date of Patent: Mar. 29, 1994

[54] APPARATUS AND METHOD FOR DETECTING FAULT IN ATM SWITCH

[75] Inventors: Masami Murayama; Yasuhiro Aso; Yoshihiro Uchida, all of Kawasaki, Japan

[73] Assignee: Fujitsu Limited, Kawasaki, Japan

[21] Appl. No.: 776,781

[22] Filed: Oct. 18, 1991

[30] Foreign Application Priority Data

Oct. 19, 1990 [JP] Japan .................... 2-280891

[51] Int. Cl.⁵ .................................. H04J 3/26
[52] U.S. Cl. ........................... 371/67.1; 371/20.1; 371/68.1; 370/60
[58] Field of Search ............ 371/67.1, 68.1, 68.2, 371/20.1, 20.2, 24, 25.1; 370/60

[56] References Cited

U.S. PATENT DOCUMENTS

4,993,018  2/1991  Hajikano et al. ............... 370/60
5,084,867  1/1992  Tachibana et al. .............. 370/60

*Primary Examiner*—Vincent P. Canney
*Attorney, Agent, or Firm*—Staas & Halsey

[57] ABSTRACT

An apparatus for detecting a fault in an ATM switch includes a stored cell number detection unit which detects a number of cells stored in the FIFO memory. A difference detection unit detects a difference between the number of cells stored in the FIFO memory and a predicted number of cells which must be stored in the FIFO memory. A difference evaluation unit determines whether or not the switch element has a fault on the basis of the difference detected by the the difference detection unit.

16 Claims, 10 Drawing Sheets

APPARATUS AND METHOD FOR DETECTING FAULT IN ATM SWITCH

BACKGROUND OF THE INVENTION (1) Field of the Invention

The present invention generally relates to an ATM (Asynchronous Transfer Mode) switch, and more particularly to an apparatus and method for detecting a fault in an ATM switch.

(2) Description of the Prior Art

Recently, there has been considerable activity in the development of ATM exchanges which realize broad band ISDNs (Integrated Services Digital Networks). Various systems for realizing the ATM systems have been proposed. An example of the proposed systems is a self routing module type switch (hereafter simply referred to as an SRM switch).

The SRM switch has the function of outputting cells input from input highways to output highways. More specifically, switch elements, each having an FIFO (First-in First-Out) memory, are provided at respective cross points of the input and output highways. Each cell has tag data (information indicating a destination output highway of the cell). At each cross point, the tag data of the input cell is compared with an output highway number assigned to each FIFO memory. When the tag data coincides with the output highway number, the input cell is stored in the FIFO memory, and then read out therefrom in response to a read signal applied to the FIFO memory.

Figure 1:
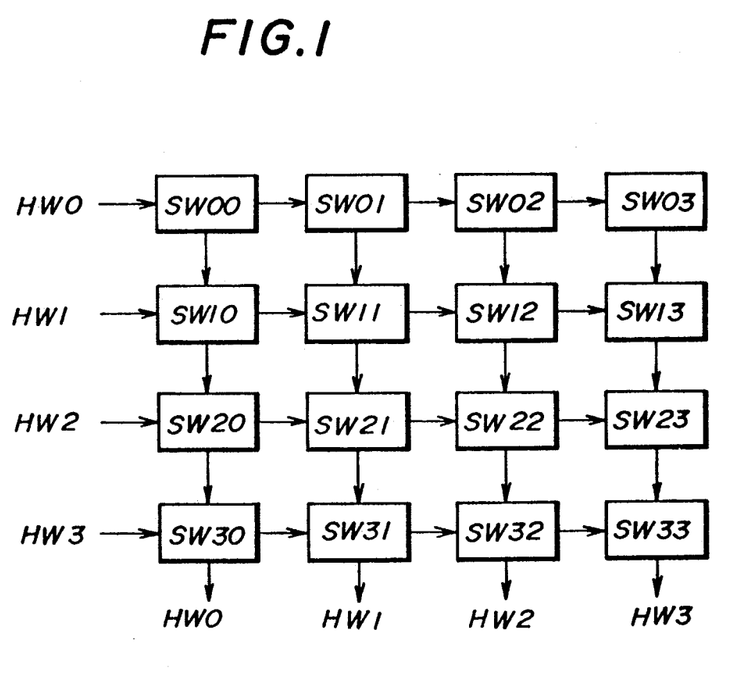
FIG. 1 is block diagram of a conventional ATM switch of the SRM type.

FIG. 1 is a block diagram of a conventional ATM switch of the SRM type. The ATM switch shown in FIG. 4 has four input highways HW0-HW3 and four output highways HW0-HW3. As shown, 16 switches SW00-SW33 are provided at respective cross points of the input high ways HW0-HW3 and the output high ways HW0-HW3. It will be noted that the switch "SW12" is positioned at the cross point of the input highway HW1 and the output highway HW2 and functions to transfer the cells via the input highway HW1 to the output highways HW2.

Figure 2:
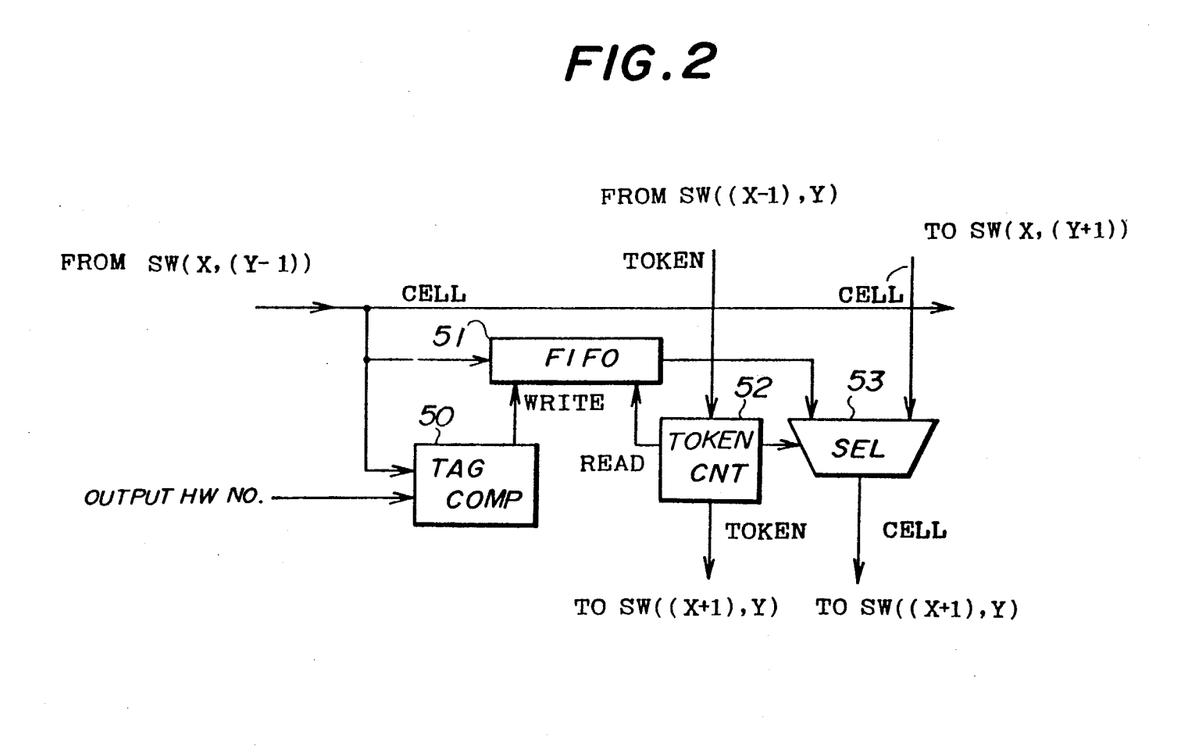
FIG. 2 is a block diagram of a switch element used in the conventional ATM switch shown in FIG. 1.

FIG. 2 shows a switch element SW(X,Y) located at a cross point of an input highway HWX (X denotes the input highway number) and an output highway HWY (Y denotes the output highway number). As shown, the switch element SW(X,Y) is composed of a tag comparator (TAG COMP) 50, an FIFO memory 51, a token controller (TOKEN CNT) 52 and a selector (SEL) 53. A token signal separately passes through each of the columns of switch elements. For example, a token signal passes through the switch elements SW00, SW10, SW20 and SW30. When the token controller 52 receives the token signal from the switch SW((X−1),Y) and generates a read control signal when there is any cell in the FIFO memory 51. When there is not any cell, the token controller 52 transfers the received token signal to the switch element SW((X+1),Y). The selector 53 selects, under the control of the token controller 52, either the cell transferred from the switch element SW((X−1),Y) or the cell read out from the FIFO memory 51, and outputs the selected cell to the select switch SW((X+1),Y).

In general, the ATM switch handles cells, each having an identical fixed length. Each cell has a header part used for switching, and an information part (payload part) in which read data to be transferred is stored. In the SRM system, the header part includes switch control data called "tag". The tag data indicates the number of an output highway (output highway number) to which the cell having this tag data is output. Since the ATM switch shown in FIG. 1 has four output highways HW0-HW3, the tag data consists of two bits. Each of the switch elements connected to the same output highway has the same output highway number.

During operation, a cell having the tag data indicating the output highway number Y is received via the input highway having the number X. The received cell is received by the switch element SW(X,Y) shown in FIG. 2. The received cell is input to the tag comparator 50, which receives, from a controller (not shown), the output highway number Y related to the switch element SW(X,Y) shown in FIG. 2. The tag comparator 50 compares the tag data in the received cell with the output highway number Y. Since the tag data shows the output highway number Y, as has been described previously, the tag controller 50 outputs a write signal to the FIFO memory 51. In response to the write signal, the cell is written into the FIFO memory 51.

The switch element SW(X,(Y−1)) positioned on the left side of the switch element SW(X,Y) shown in FIG. 2 receives an output highway number (Y−1) from the controller. Thus, the tag comparator 50 of the switch element SW(X,(Y−1)) does not generate the write signal. Hence, the cell passes through the switch element SW(X,(Y−1)) without being written into the FIFO memory 51 thereof. Each of the switch elements of the ATM switch operates in the same manner as described above.

Since a plurality of FIFO memories are connected to one output highway. If cells are simultaneously read out from some of the FIFO memories, the cells will have a collision with each other. In order to avoid such a collision, the ATM system is designed so that cell data called token or token signal passes through the switch elements in each column. For example, the token signal related to the output highway HW0 is circulated through the switch elements SW00, SW10, SW20, SW30, SW00, . . . in this order.

When the token controller 52 receives the token signal from the switch element SW((X−1),Y), determines whether or not there is any cell in the FIFO memory 51. When it is determined that there is not any cell in the FIFO memory 51, the token controller 52 transfers the received token signal to the token controller 52 of the switch element SW((X+1),Y). When it is determined that there is any cell, the token controller 52 outputs a read signal to the FIFO memory 51. In response to the read signal, one cell is read out from the FIFO memory 51 and applied to the selector 53. At this time, the token controller 52 instructs the cell 53 to select the cell from the FIFO 51. After the cell is output to the switch element SW((X+1),Y), the token controller 52 of the switch element SW(X,Y) transfers the received token signal to the token controller 52 of the switch element SW((X+1),Y).

If a fault occurs in the tag controller 50, a cell which should be written into the FIFO memory 51 will not be written therein or a cell which should not be written into the FIFO memory 51 will be written therein. If a fault occurs in the token controller 52, a cell will be read out from the FIFO memory 51 without receiving the token signal or the token signal is received nevertheless a cell will not be read out therefrom. The above erroneous operations destroys the cells or make the FIFO memory 51 congested with cells. Thus, it is required that the switch elements of the ATM switch be supervised in order to determine whether or not the switch elements operate correctly.

In order to supervise the switch elements, it may be possible to add a parity to each cell and switch the parity-added cell. Thereby, it becomes possible to execute the parity check on the input and output sides of the FIFO memory 51 and the input and output sides of the selector 53. However, it is still impossible to determine whether or not the tag comparator 50 has a fault and determine whether or not the token controller 52 has a fault because there is no change in the parity.

SUMMARY OF THE INVENTION

It is a general object of the present invention to provide an apparatus and method for definitely detecting a fault in the write and read procedures on each FIFO memory.

The above object of the present invention is achieved by an apparatus for detecting a fault in an ATM switch having a switch element positioned at a cross point of an input highway and an output highway, the switch element including an FIFO memory, the apparatus comprising: first means, coupled to the FIFO memory, for detecting a number of cells stored in the FIFO memory; second means, coupled to the first means and the FIFO memory, for detecting a difference between the number of cells stored in the FIFO memory and a predicted number of cells which must be stored in the FIFO memory; and third means, coupled to the second means, for determining whether or not the switch element has a fault on the basis of the difference detected by the second means.

The above-mentioned object of the present invention is also achieved by an apparatus for detecting a fault in an ATM switch having a switch element positioned at a cross point of an input highway and an output highway, the switch element including an FIFO memory, the apparatus comprising: first means, coupled to the FIFO memory, for detecting a number of cells stored in the FIFO memory; second means, coupled to the FIFO memory, for maintaining the FIFO memory in a state where the FIFO memory is prevented from receiving an input cell via the input highway and for generating test cells written into the FIFO memory; and third means, coupled to the FIFO memory, for sequentially reading out the test cells from the FIFO memory; fourth means, coupled to the first and the means, for determining whether or not the switch element has a fault on the basis of the number of test cells in the FIFO memory which is detected by the first means during a time when the third means sequentially reads out the test cells from the FIFO memory.

The above-mentioned object of the present invention is also achieved by a method for detecting a fault in an ATM switch having a switch element positioned at a cross point of an input highway and an output highway, the switch element including an FIFO memory, the method comprising the steps of:

(a) detecting a number of cells stored in the FIFO memory;

(b) detecting a difference between the number of cells stored in the FIFO memory and a predicted number of cells which must be stored in the FIFO memory; and (c) determining whether or not the switch element has a fault on the basis of the difference detected by the step (b).

The above-mentioned object of the present invention is also achieved by a method for detecting a fault in an ATM switch having a switch element positioned at a cross point of an input highway and an output highway, the switch element including an FIFO memory, the method comprising the steps of:

(a) detecting a number of cells stored in the FIFO memory;

(b) maintaining the FIFO memory in a state where the FIFO memory is prevented from receiving an input cell via the input highway and generating test cells written into the FIFO memory;

(c) sequentially reading out the test cells from the FIFO memory; and (d) determining whether or not the switch element has a fault on the basis of the number of test cells in the FIFO memory which is detected by the step (a) during a time when the step (c) sequentially reads out the test cells from the FIFO memory.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 3:
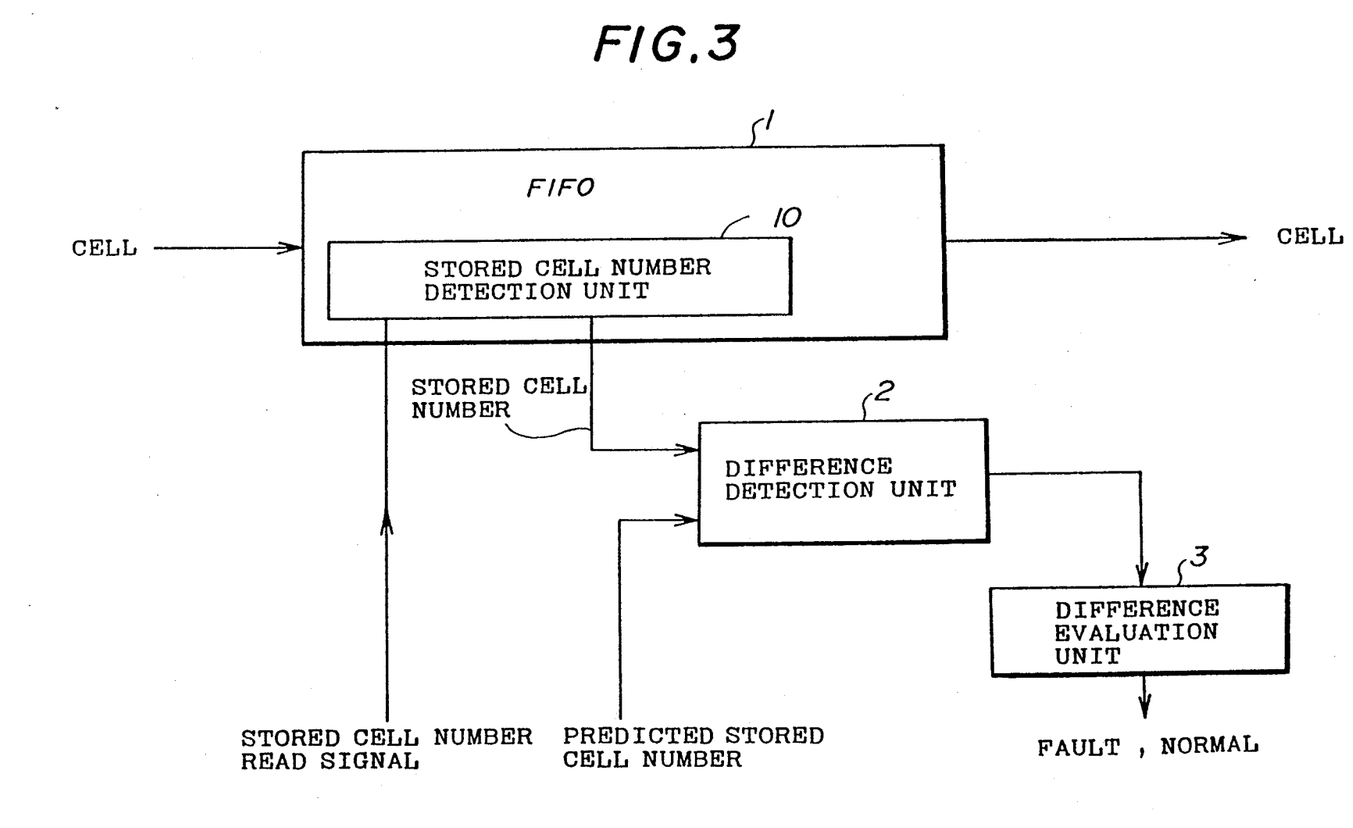
FIG. 3 is a block diagram of an outline of a first preferred embodiment of the present invention.

Referring to FIG. 3, a switch element is composed of an FIFO memory 1, a difference detection unit 2 and a difference evaluation unit 3. The FIFO memory 1 includes a stored cell number detection unit 10, which detects the number of cells stored in the FIFO memory 1. The switch element has the same cell writing and reading functions as the aforementioned switch element.

A stored cell number read signal, which is generated by a controller (not shown in FIG. 3), is input to the stored cell number detection unit 10. In response to this signal, the detection unit 10 detects the number of cells stored in the FIFO memory 1, which have been written therein but has not been read out therefrom. The stored cell number detected by the stored cell number unit 10 is supplied to the difference detection unit 2, which receives a predicted number of cells stored in the FIFO memory 1 from the controller. Then, the difference detection unit 2 calculates the difference (absolute value) between the detected stored cell number and the predicted stored cell number. The predicted stored cell number can be statistically obtained based on, for example, the bit rates of the terminals which are declared during a call setup procedure as well as the history of the previous routing. The difference calculated by the difference detection unit 2 is supplied to the difference evaluation unit 3, which evaluates the difference and determines whether or not an appropriate number of cells have been stored in the FIFO memory 1.

Figure 4A:
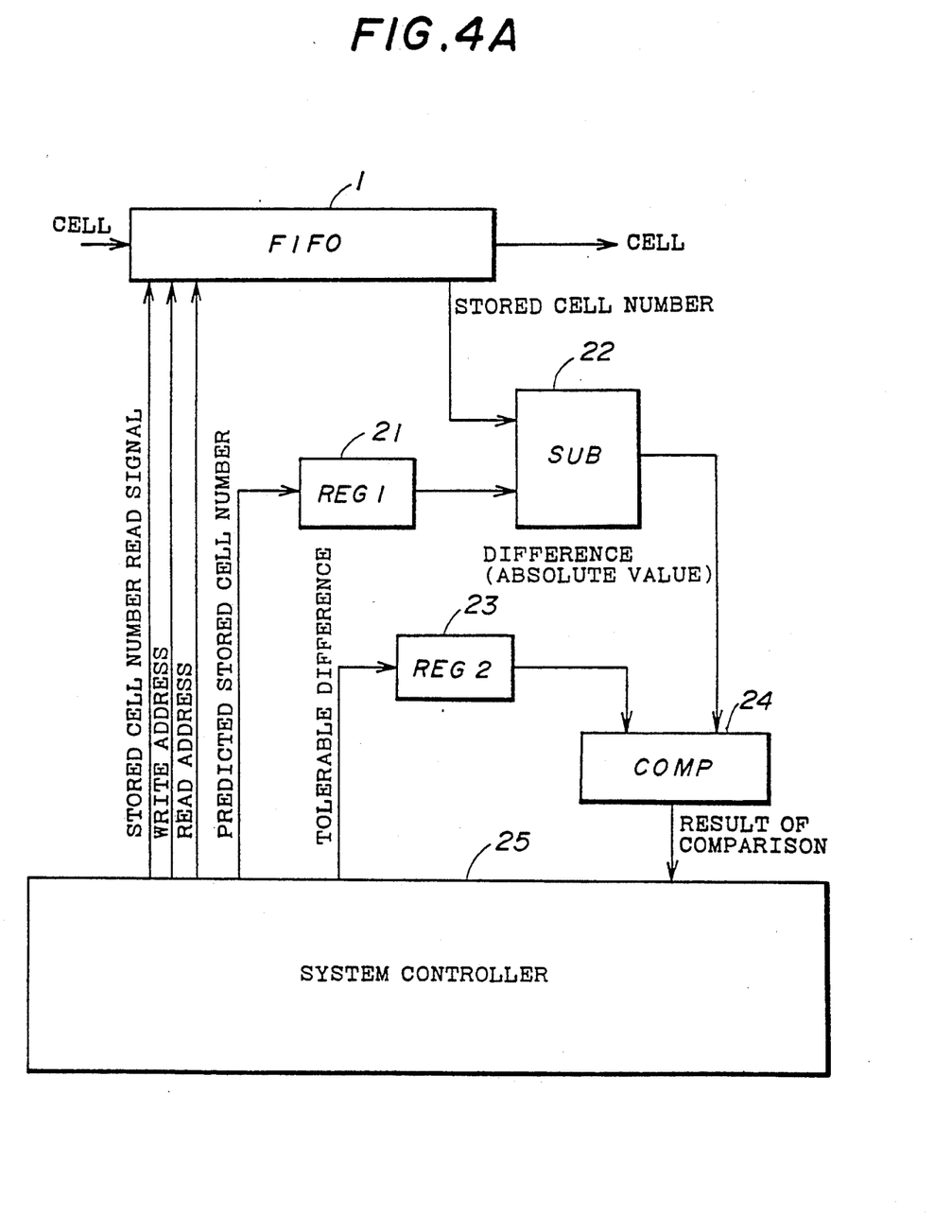
FIG. 4A is a block diagram showing the structure shown in FIG. 3 in more detail.

FIG. 4A is a block diagram showing the structure shown in FIG. 3 in more detail. The switch element shown in FIG. 4A is composed of the FIFO memory 1, a register (REG1) 21, a subtracter (SUB) 22, a register (REG2) 23, a comparator (COMP) 24, and a system controller 25. The difference detection unit 2 shown in FIG. 3 includes the register 21 and the subtracter 22, and the difference evaluation unit 3 includes the register 23, the comparator 24 and the system controller 25.

Figure 4B:
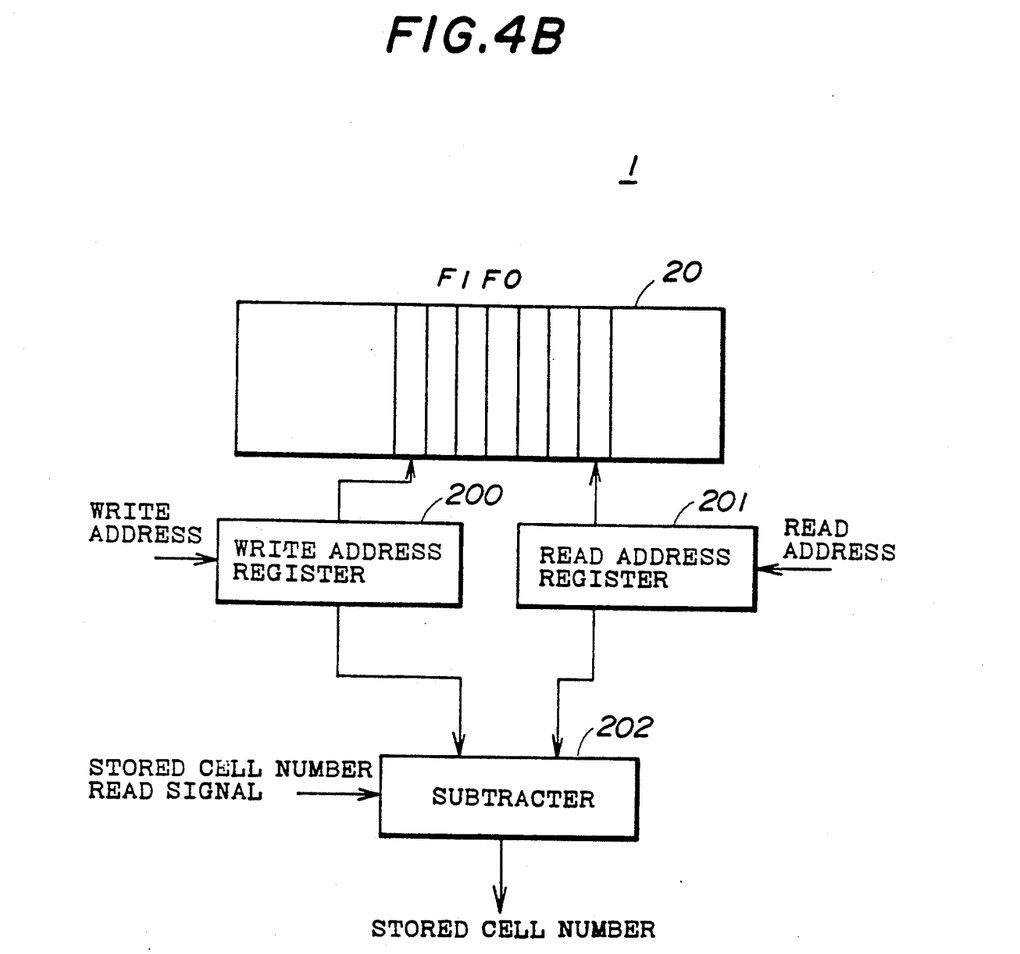
FIG. 4B is a block diagram showing an FIFO memory shown in FIG. 4A in more detail.

FIG. 4B is a block diagram of the FIFO memory 1 shown in FIG. 4A. The FIFO memory 1 is composed of an FIFO memory element 20, a write address register 200, a read address register 201 and a subtracter 202. The write address register 200 stores a write address supplied from the system controller 25. The read address register 201 stores a read address supplied from the system controller 25. The write and read addresses are supplied to the FIFO memory element 20, and the subtracter 202. In response to the stored cell number read signal from the system controller 25, the subtracter 202 calculates the difference between the write address and the read address. The calculated difference indicates the number of cells stored in the FIFO memory element 20.

A description will now be given of a procedure for detecting a fault which has occurred in the switch element shown in FIGS. 4A and 4B with reference to FIG. 5 in addition thereto. At step 101, the system controller 25 writes the predicted stored cell number into the register 21 and writes a tolerable difference into the register 23. It will be noted that it is very difficult to definitely predict the number of cells stored in the FIFO memory element 20 because the ATM exchange including the switch element shown in FIGS. 4A and 4B may handle burst data or the load of the switch element will change with time. From this point of view, the switch element may operate correctly even if the number of cells actually stored in the FIFO memory 1 is greater than the predicted stored cell number. For the above reason, it is necessary to define a tolerable range for concluding that the switch system does not have any fault in the state where a number of cells greater than the predicted stored cell number have been stored in the FIFO memory 1 but the difference calculated by the subtracter 22 falls within the tolerable range. The tolerable difference shows the above tolerable range. It is preferable to update the tolerable difference by the system controller 25 each time a call is received. Of course, it may be possible to use the constant tolerable difference.

Figure 5:
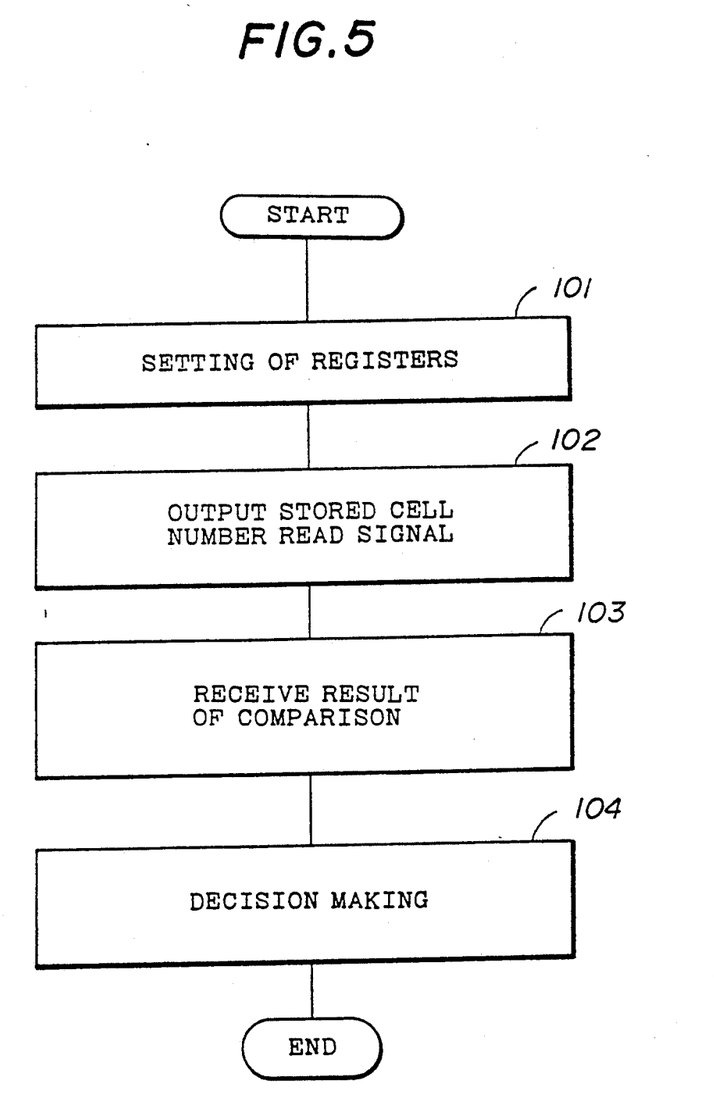
FIG. 5 is a flowchart of a test procedure executed under the control of a system controller shown in FIG. 4A.

At step 102 shown in FIG. 5, the system controller 25 periodically outputs the stored cell number read signal to the FIFO 1 (more specifically the subtracter 202 shown in FIG. 4B). Then, the stored cell number is read out from the subtracter 202 and applied to the subtracter 22 shown in FIG. 4A. The predicted stored cell number stored in the register 21 is applied to the subtracter 22, which calculates the difference between the received numbers and outputs the absolute value of the difference to the comparator 24. Then, the comparator 24 compares the absolute value of the difference from the subtracter 22 with the tolerable difference from the register 23, and outputs the result of the comparison. At step 103, the system controller 25 receives the result of the comparison, and determines whether or not a fault has occurred in the switch element. When the absolute value of the difference exceeds the tolerable difference, the system controller 25 determines that a fault has occurred in the switch element. In this case, the system controller executes a predetermined procedure, such as a system reconfiguration.

It is possible to directly transfer the stored cell number output by the subtracter 202 shown in FIG. 4B to the system controller 25. In this case, the system controller 25 has the functions of the registers 21 and 23, the subtracter 22 and the comparator 24.

Figure 6:
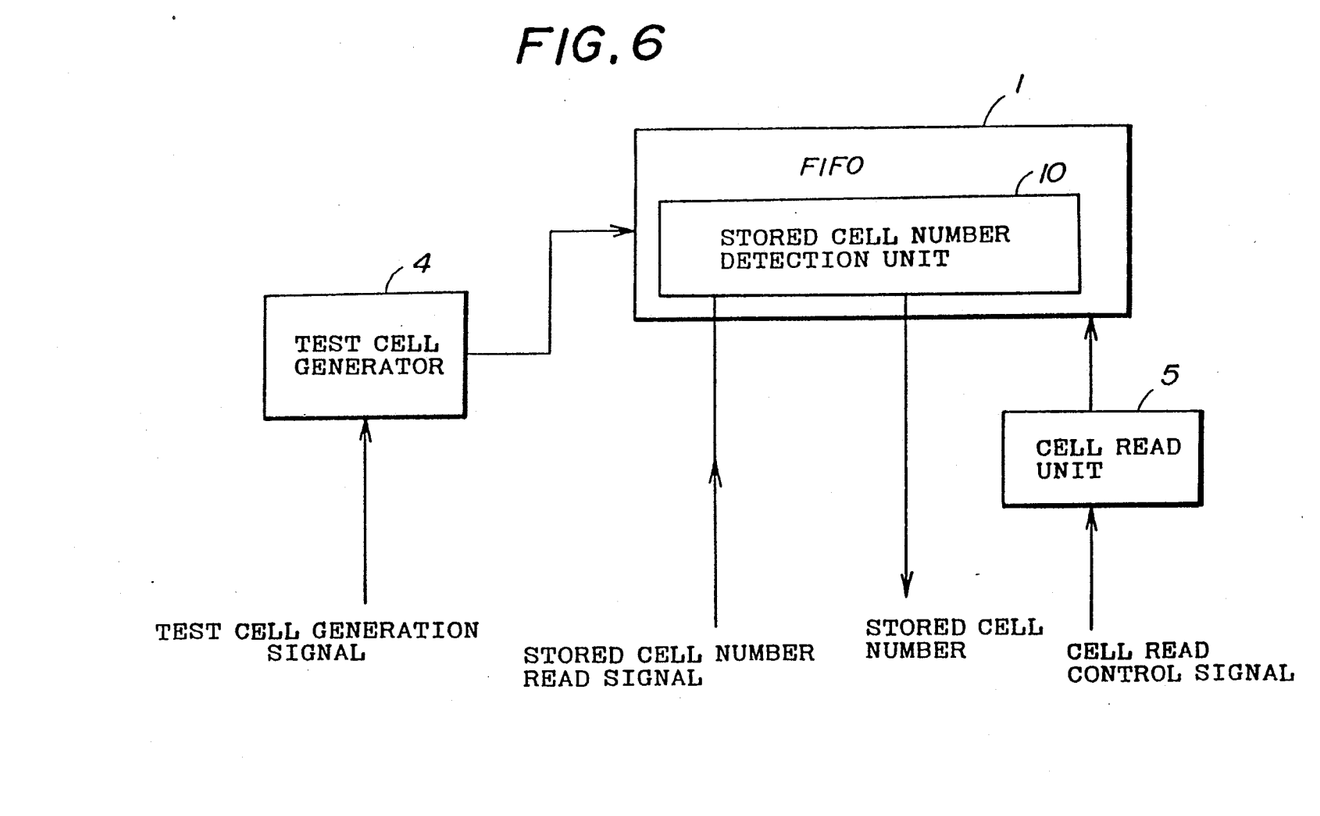
FIG. 6 is a block diagram of an outline of a second preferred embodiment of the present invention.

A description will now be given of a second preferred embodiment of the present invention with reference to FIG. 6, which shows an outline thereof. As shown in FIG. 6, a test cell generator 4 and a cell read control unit 5 are provided for the FIFO memory 1. During the test procedure, the tag data of the input cell is controlled to the FIFO 1 by a controller (not shown in FIG. 6) in a manner described later, and a cell read control signal generated by the controller is supplied to the cell read control unit 5, which generates a cell read signal therefrom. The cell read signal is input to the FIFO memory 1, and all cells stored in the FIFO memory 1 are read out therefrom. After all the cells have been read out from the FIFO memory 1, the aforementioned stored cell number read signal generated by the controller is applied to the stored cell number detection unit 10 of the FIFO memory 1. Then, the stored cell number is output to the controller, which determines whether or not the stored cell number is "0".

If the result of this determination is negative, it is concluded that a fault has occurred in the switch element shown in FIG. 6. If the result of the above determination is affirmative, the controller outputs a test cell generation signal to the test cell generator 4. Then, a test cell is generated and input to the FIFO memory 1 by a routing control procedure, which controls the tag data, as will be described later. Then, the test cell is written into the FIFO memory 1. Thereafter, the stored cell number read signal is applied to the stored cell number detection unit 10. If the switch element shown in FIG. 6 operates correctly, the stored cell number detected by the detection unit 10 is "1". After confirming that the stored cell number is "1", the read signal is applied to the cell read control unit 5, which reads out the cell from the FIFO memory 1. Then, the stored cell number read signal is applied to the stored cell number detection unit 10. If the switch element shown in FIG. 6 operates correctly, the stored cell number detected by the detection unit 10 is "0". In this manner, the above-mentioned test procedure is repeatedly carried out a predetermined number of times.

Figure 7:
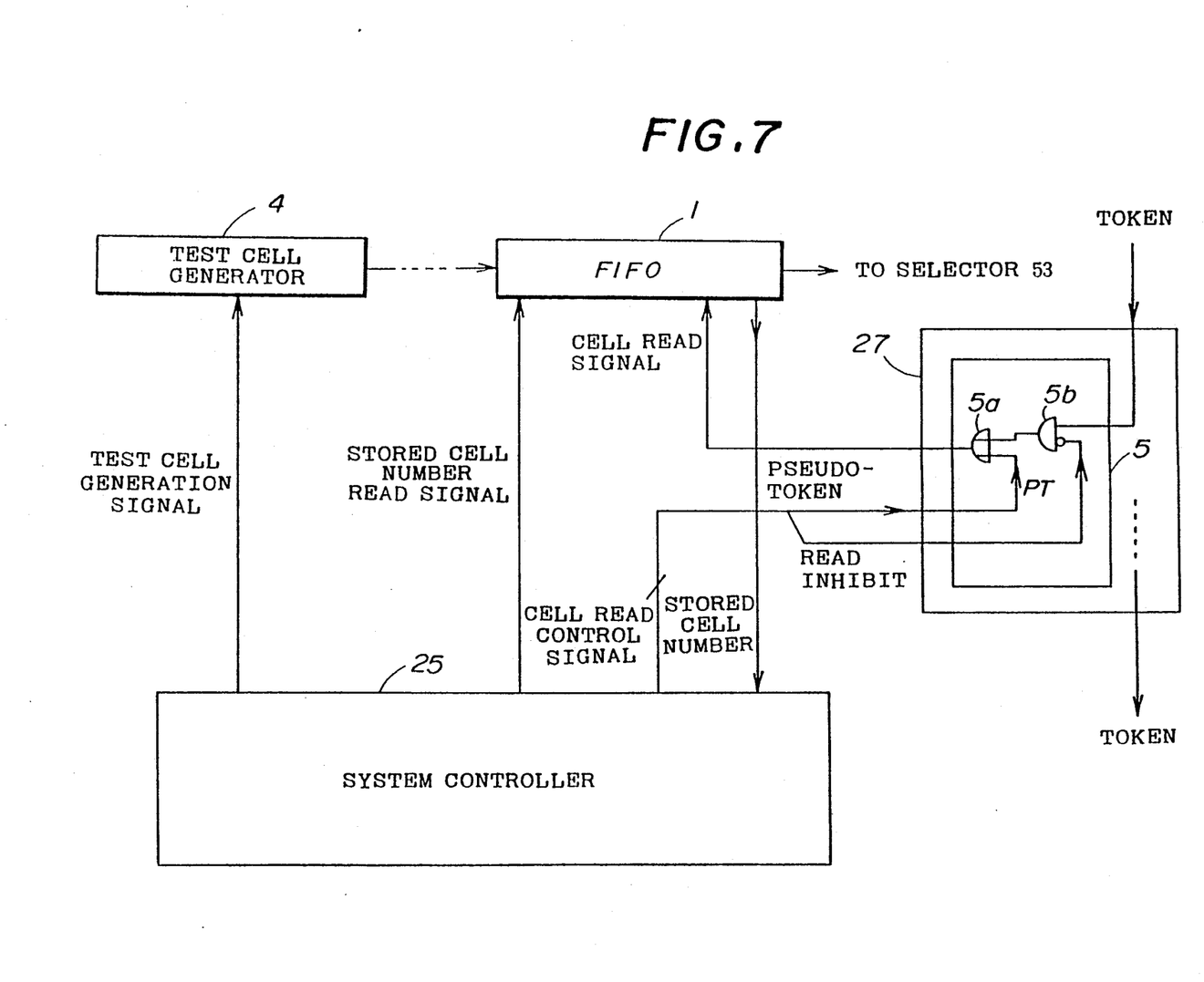
FIG. 7 is a block diagram showing the structure shown in FIG. 6 in more detail.

FIG. 7 is a block diagram of the structure shown in FIG. 6 in more detail. As shown, the switch element shown in FIG. 7 is composed of the FIFO memory 1, the system controller 25 and a token controller 27, which includes the cell read control unit 5 shown in FIG. 6. The test cell generator 4 is provided in common to all the switch elements of the ATM switch, as will be described later.

The system controller 25 outputs a cell read control signal to the cell read control unit 5, which is composed of an AND gate 5a having an inverter, and an OR gate 5b. The cell read control signal includes a cell read inhibiting signal HW and a pseudo-token signal PT. When the cell read inhibiting signal HW has a polarity (level) showing that the reading of a cell is inhibited, the token controller 27 transfers the token signal received from the previous switch element to the subsequent switch element. Thereby, the token signal is received nevertheless the cell reading procedure is not executed. In this state, a test procedure shown in FIG. 8 is executed.

Figure 8:
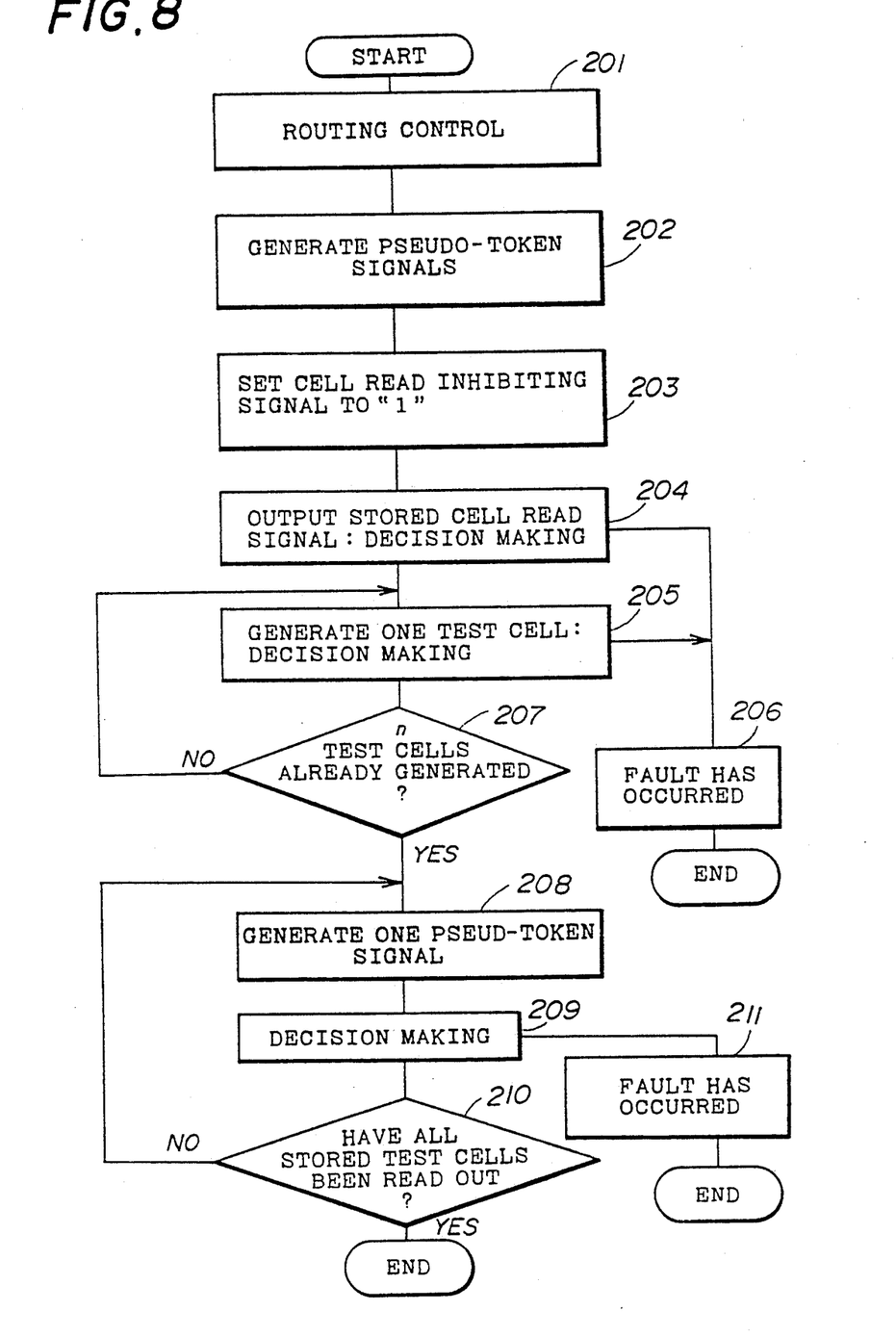
FIG. 8 is a flowchart of a test procedure executed under the control of a system controller shown in FIG. 7.

At step 201 shown in FIG. 8, the system controller 25 executes the routing control procedure for preventing the input cell which is to be switched from being input to the switch element which is to be tested. As will be described later, the system controller 25 rewrite the tag data of the input cell so that the input cell is prevented from being input to the output highway to which the switch element to be tested is connected. After the routing control procedure is started, all cells stored in the FIFO memory 1 will be read out therefrom without executing a specific procedure. If it is desired that all cells be immediately read out from the FIFO memory 1, at step 202 the cell read inhibiting signal HW is set to "1" (cell read inhibiting level) and many pseudo-token signals PT are output to the cell read control unit 5.

At step 203, the system controller 25 sets the cell read inhibiting signal to "1" (inhibit side), which is applied to the AND gate 5a via the inverter. At step 204, the system controller 25 outputs the stored cell number read signal to the FIFO memory 1, and determines whether or not the stored cell number is "0". When the stored cell number is not "0" after the steps 201 through 203 have been executed, it is determined, at step 206, that a fault has occurred in the switch element. On the other hand, when the stored cell number is "1", the system controller 25 executes step 205, at which step one test cell is generated. The test cell has tag data addressed to the switch element which is to be tested and arbitrary test data. At step 205, the system controller 25 outputs the stored cell number read signal to the FIFO memory 1, and determines whether or not the stored cell number is "1". If the result of this decision is negative, a fault has occurred in the switch element. If the result is affirmative, the system controller executes step 208, at which step it is determined that a predetermined (desired) number of test cells have been generated. When the result is NO, the procedure returns to step 205. In this manner, the steps 205 and 207 are repeatedly carried out until the result at step 207 become affirmative. It is preferable that The number of test cells which is to be generated corresponds to the storage capacity of the FIFO memory 1.

At step 208, the system controller 25 outputs the pseudo-token signal PT to the token controller 27. Thereby, one test cell is read out from the FIFO memory 1 if the switch system shown in FIG. 7 operates correctly. At step 209, the system controller 25 outputs the stored cell number read signal to the FIFO memory 1 and determines that the stored cell number detected by the stored cell number detection unit 10 (which corresponds to the subtracter 202 shown in FIG. 4B) is equal to (n−1). When the result of this decision is negative, it is determined, at step 211, that the switch element has a fault. On the other hand, when the result is affirmative, the system controller 25 executes step 210, at which step it is determined that all the stored test cells have been read out from the FIFO memory 1 (that is, n=0). When the result obtained at step 210 is NO, the system controller 208 executes step 208, at which step the pseudo-token signal is output to the token controller 27. At step 209, the stored cell number read signal is output to the FIFO memory 1 and it is determined whether or not the stored cell number is equal to (n−2). In the above-mentioned manner, the steps 208-210 are repeatedly carried out.

Figure 9:
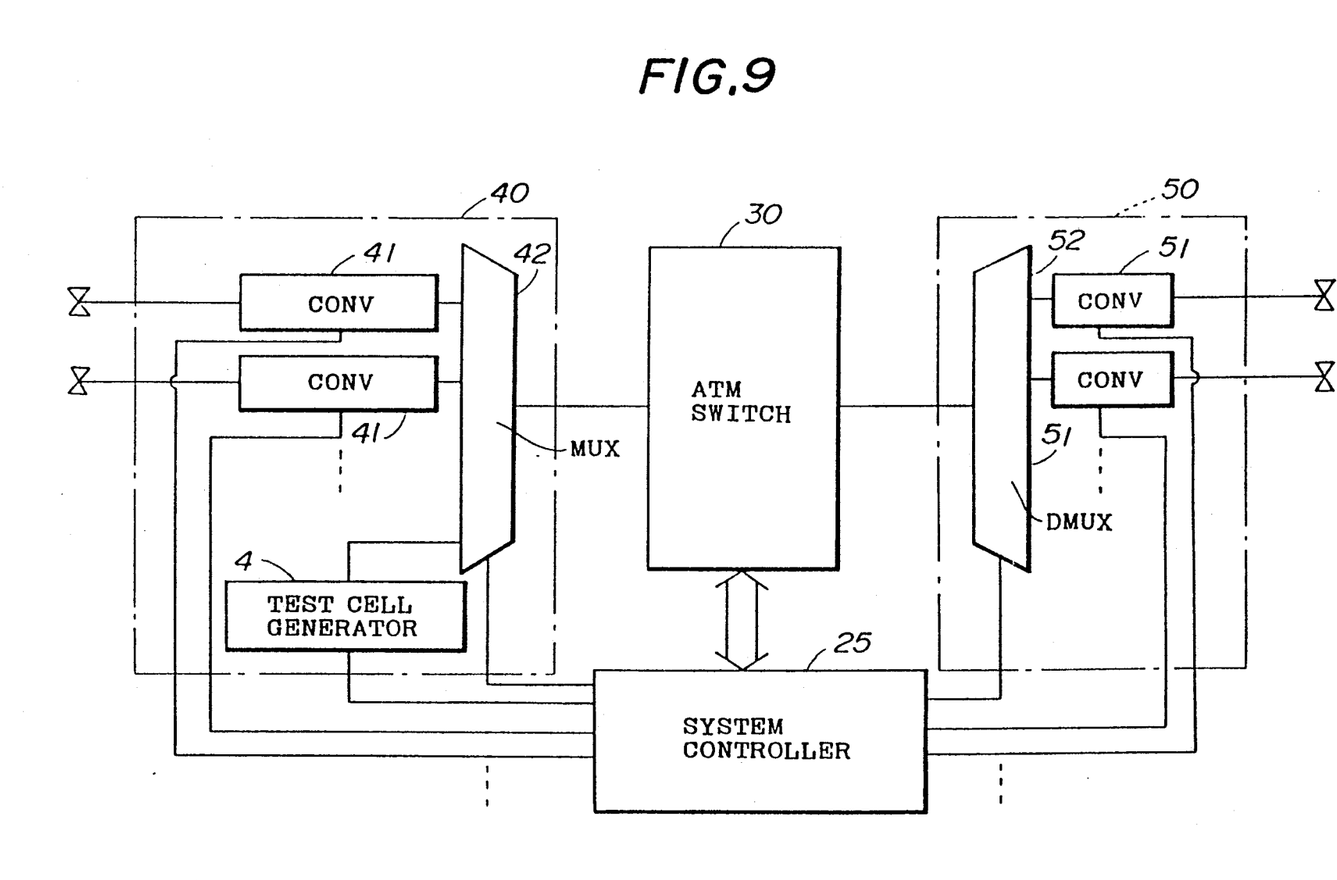
FIG. 9 is a block diagram of an ATM switch system to which the present invention is applied.

FIG. 9 is a block diagram of an ATM switch system to which the second preferred embodiment of the present invention is applied. The ATM switch system is composed of an ATM switch 30, a terminal interface unit 40, a terminal interface unit 50 and the aforementioned system controller 25. The ATM switch is composed of a plurality of switch elements located at cross points of input and output highways, each of the switch elements having the aforementioned structure. The terminal interface unit 40 is composed of a plurality of VCI/VPI (Virtual Channel Identifier/Virtual Path Identifier) converters 41, a multiplexer 42 and the aforementioned test cell generator 4. In the case that the ATM switch system employs the first embodiment of the present invention, the test cell generator 4 is not used. Each of the converter 41 accommodates a subscriber terminal, and has the functions of adding the tag data to the input cell under the control of the system controller 25. When a switch element in the ATM switch 30 is tested, each converter 41 adds to each input cell tag data showing an output highway other than the output highway to which a switch element which is to be tested is connected. Further, under the control of the system controller 25, the test cell generator 4 generates the test cell having tag data showing the output highway number related to the switch element to be tested. The multiplexer 42 multiplexes signals from the converters 41 and generates a high-speed multiplexed signal, which is input to the ATM switch.

The terminal interface unit 50 is composed of a plurality of VCI/VPI converters 51, and a demultiplexer 52. The demultiplexer 52 demultiplexes the multiplexed signal from the ATM switch 30. Each converter 51 removes the tag data from each cell.

The present invention is not limited to the specifically disclosed embodiments, and variations and modifications may be made without departing from the scope of the present invention.

What is claimed is:

1. An apparatus for detecting a fault in an ATM switch having a switch element positioned at a cross point of an input highway and an output highway, said switch element including an FIFO memory, said apparatus comprising:

first means, coupled to the FIFO memory, for detecting a number of cells stored in the FIFO memory;
second means, coupled to said first means and the FIFO memory, for detecting a difference between the number of cells stored in the FIFO memory and a predicted number of cells which must be stored in the FIFO memory; and
third means, coupled to said second means, for determining whether or not said switch element has a fault on the basis of said difference detected by said second means.

2. An apparatus as claimed in claim 1, wherein said third means comprises fourth means, coupled to said second means, for comparing said difference detected by said second means with a predetermined tolerable difference and for determining whether or not said switch element has a fault on the basis of a relationship between said difference and said predetermined tolerable difference.

3. An apparatus as claimed in claim 2, wherein said fourth means comprises means for determining that said switch element has a fault when said difference detected by said second means exceeds said predetermined tolerable difference.

4. An apparatus as claimed in claim 1, wherein 1, wherein:
said first means comprises means for detecting an address difference between a write address of the FIFO memory supplied from an external device and a read address thereof supplied from the external device; and
said address difference corresponds to the number of cells stored in the FIFO memory.

5. An apparatus as claimed in claim 4, wherein said means of said first means comprises;
a write address register storing the write address;
a read address register storing the read address; and
a subtracter generating the difference between the write address in said write address register and the read address in said read address register.

6. An apparatus for detecting a fault in an ATM switch having a switch element positioned at a cross point of an input highway and an output highway, said switch element including an FIFO memory, said apparatus comprising:
first means, coupled to the FIFO memory, for detecting a number of cells stored in the FIFO memory;
second means, coupled to the FIFO memory, for maintaining the FIFO memory in a state where the FIFO memory is prevented from receiving an input cell via said input highway and for generating test cells written into the FIFO memory; and
third means, coupled to the FIFO memory, for sequentially reading out said test cells from the FIFO memory;
fourth means, coupled to said first and said means, for determining whether or not said switch element has a fault on the basis of the number of test cells in the FIFO memory which is detected by said first means during a time when said third means sequentially reads out the test cells from the FIFO memory.

7. An apparatus as claimed in claim 6, wherein said third means comprises:
fifth means for preventing a token signal supplied from an external device from being input to said FIFO memory, said token signal allowing a cell stored in said FIFO memory to be read out therefrom; and
sixth means for generating a pseudo-token signal to said FIFO memory and for outputting said pseudo-token signal to said FIFO memory instead of said token signal,
said test cells being read out from said FIFO memory one by one each time said pseudo-token signal generated and output by said sixth means is applied to said FIFO memory.

8. An apparatus as claimed in claim 7, wherein:
said fifth means comprises means for generating a logic signal which has an inhibiting level which is set when said fifth means prevents the token signal supplied from the external device from being input to said FIFO memory; and
said sixth means comprises means for passing said pseudo-token signal and for outputting the pseudo-token signal to said FIFO memory when the logic signal has the inhibiting level.

9. An apparatus as claimed in claim 6, wherein 7, wherein said fifth means comprises means for determining whether or not the number of test cells stored in the FIFO memory is reduced by 1 each time one of the test cells is read out from the FIFO memory in response to the pseudo-token signal.

10. An apparatus as claimed in claim 6, wherein said fourth means comprises means for generating n test signals where n is an integer and corresponds to a storage capacity of said FIFO memory.

11. An apparatus as claimed in claim 6, wherein:
said first means comprises means for detecting an address difference between a write address of the FIFO memory supplied from an external device and a read address thereof supplied from the external device; and
said address difference corresponds to the number of test cells stored in the FIFO memory.

12. An apparatus as claimed in claim 6, wherein:
said ATM switch includes a plurality of switch elements; and
said second means is provided in common to said plurality of switch elements.

13. A method for detecting a fault in an ATM switch having a switch element positioned at a cross point of an input highway and an output highway, said switch element including an FIFO memory, said method comprising the steps of:
(a) detecting a number of cells stored in the
(b) detecting a difference between the number of cells stored in the FIFO memory and a predicted number of cells which must be stored in the FIFO memory; and
(c) determining whether or not said switch element has a fault on the basis of said difference detected by the step (b).

14. A method as claimed in claim 13, further comprising the steps of:
comparing said difference detected by the step (b) with a predetermined tolerable difference; and
determining whether or not said switch element has a fault on the basis of a relationship between said difference and said predetermined tolerable difference.

15. A method for detecting a fault in an ATM switch having a switch element positioned at a cross point of an input highway and an output highway, said switch element including an FIFO memory, said method comprising the steps of:
(a) detecting a number of cells stored in the FIFO memory;
(b) maintaining the FIFO memory in a state where the FIFO memory is prevented from receiving an input cell via said input highway and generating test cells written into the FIFO memory;
(c) sequentially reading out said test cells from the FIFO memory; and
(d) determining whether or not said switch element has a fault on the basis of the number of test cells in the FIFO memory which is detected by the step (a) during a time when the step (c) sequentially reads out the test cells from the FIFO memory.

16. A method as claimed in claim 15, wherein the step (c) comprises the steps of:

(c-1) preventing a token signal supplied from an external device from being input to said FIFO memory, said token signal allowing a cell stored in said FIFO memory to be read out therefrom; and (c-2) generating a pseudo-token signal to said FIFO memory and outputting said pseudo-token signal to said FIFO memory instead of said token signal, said test cells being read out from said FIFO memory one by one each time said pseudo-token signal generated and output by the (c-1) is applied to said FIFO memory.

* * * * *

UNITED STATES PATENT AND TRADEMARK OFFICE
CERTIFICATE OF CORRECTION

PATENT NO. : 5,299,209
DATED : March 29, 1994
INVENTOR(S) : Masami MURAYAMA et al.

It is certified that error appears in the above-indentified patent and that said Letters Patent is hereby corrected as shown below:

On the cover page, [57] Abstract, line 9, delete "the" (third occurrence).

Col. 1, line 37, change "high ways" to --highways--.

Col. 7, line 53, change "The" to --the--.

Col. 9, line 11, delete "wherein 1,".

Col. 10, line 35, after "the" insert --FIFO memory;--.

Signed and Sealed this

Sixth Day of September, 1994

Attest:

BRUCE LEHMAN

*Attesting Officer*      *Commissioner of Patents and Trademarks*